Figure 1:
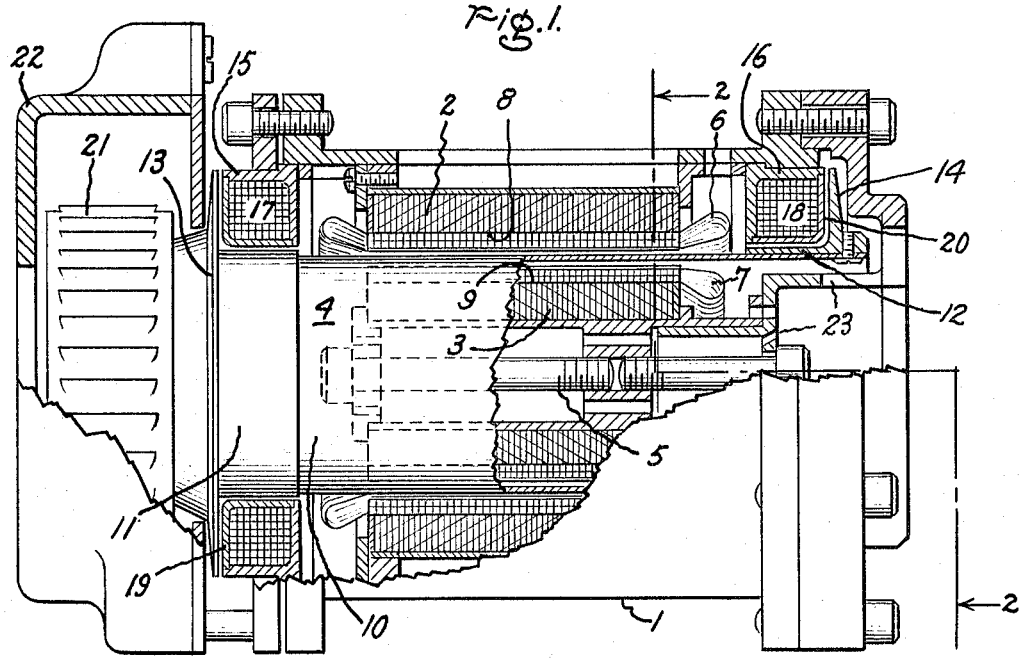

Nov. 29, 1966   T. A. BUCHHOLD   3,289,019
ROTATING MACHINE
Filed May 6, 1965

Inventor:
Theodor A. Buchhold,
by John P. Dellitt
His Attorney.

United States Patent Office 3,289,019
Patented Nov. 29, 1966

3,289,019
ROTATING MACHINE
Theodor Adam Buchhold, Schenectady, N.Y., assignor to General Electric Company, a corporation of New York
Filed May 6, 1965, Ser. No. 453,586
9 Claims. (Cl. 310—52)

This invention relates to rotating electric machines and particularly to a motor adapted for operation at super-cold or cryogenic temperatures.

Conventional rotating electric machines generally do not operate satisfactorily at super-cold or cryogenic temperatures approaching absolute zero principally because high bearing friction at these temperatures results in short operating lifetime. Moreover, conventional lubricants become solid in this temperature region.

An electric machine which is suitable for operation at cryogenic temperatures is set forth and claimed in my Patent 3,005,117, issued October 17, 1961, and assigned to the assignee of the present invention. This machine includes a superconductive rotor supported for rotation within magnetic bearings. A first or stationary magnetic field supports the rotor because of a superconductor's property of excluding or repelling a magnetic field. The machine is of the synchronous type wherein the machine's stator provides a second or rotating magnetic field around the superconducting rotor, causing the rotor to turn synchronously with the field. In the illustrated embodiment of the invention, the superconducting rotor has an irregular shape, e.g. polygonal in cross-section, for providing an irregular spacing between rotor and stator. As the stator field rotates, the pressure of the field against the irregular superconducting rotor "catches" the rotor and causes the rotor to follow the rotation of the stator field. To bring the motor up to speed, an adjustable frequency stator source may be employed, or else a feedback follow-up system is used for causing the rotating stator field to come up to the desired speed as the rotor's mechanical speed increases.

The machine according to the present invention differs and provides certain advantages in that its rotor has a non-superconducting portion rather than a superconducting one where it confronts the stator. A magnetic field floats the rotor bearing-wise, being repelled by separate superconducting portions of the rotor. However the rotating field of the stator is able to penetrate the rotor's non-superconducting portion and induce currents therein. The present rotor has a regular rather than an irregular shape where it confronts the stator, that is it has a substantially continuous surface of metal adjacent and at a substantially constant distance from the stator, and may be formed of quite thin light-weight metal, e.g. 0.05 cm. thick aluminum in one example construction. Despite the rotor's thinness, the rotating electric field flux of the stator is able to induce large currents in the rotor since the rotor has a very small (but detectable) resistance at cryogenic temperatures. The large induced currents flowing through the low resistance react with the field of the stator providing appreciable torque and quite powerful rotation of the rotor. It should be observed that if this portion of the rotor were superconducting, having zero resistance, then no flux could penetrate the rotor.

As can be seen, this rotor operates on the induction principle and comes up to speed automatically when the stator windings are energized. Because of the rotor's mechanical simplicity and because no follow-up system is needed for starting, the machine according to the present invention provides advantages of simplicity and economy for low temperature operation.

In accordance with an additional feature of the present invention, the stator is formed in two portions, an inner portion and an outer portion juxtaposed to define a small uniform cylindrical gap therebetween. The rotor includes a non-superconducting cylindrical section received within this gap for rotation therein. This non-superconducting section of the rotor within the stator gap is preferably formed of non-magnetic material. Therefore the magnetic flux paths in the machine are determined only by a stationary stator gap between stator portions and are not influenced by movement of the rotor, if, for example, the rotor should move slightly off axis. Therefore the construction provides enhanced stability of operation.

It is accordingly an object of the present invention to provide a simplified and improved rotating electric machine for use at low temperatures.

It is another object of the present invention to provide an improved motor suitable for operation at cryogenic temperatures, said motor being economical in construction and stable in operation.

It is a further object of the present invention to provide a motor suitable for operation at cryogenic temperatures which does not require starting circuitry since it supplies its own high starting torque.

Figure 2:
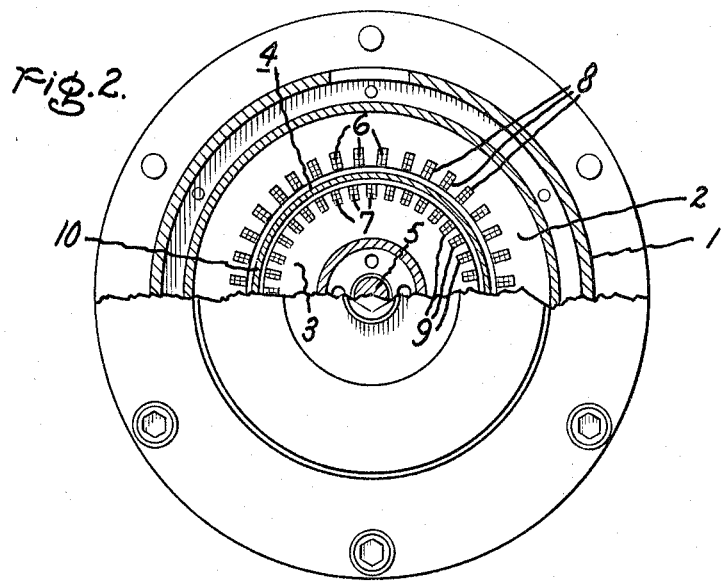

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a cutaway view partially in longitudinal cross-section of the motor in accordance with the present invention, and FIG. 2 is an end view of the same motor partially in cross-section taken at 2—2 in FIG. 1.

The electric machine or motor in accordance with the present invention is designed for operation in a cryogenic environment, e.g. for immersion in liquid helum at a temperature of approximately 4.2° K. It is also possible to operate in a gaseous environment at a low temperature. The cooling medium circulates through the motor so that essentially all its components parts will reach the temperature of the coolant.

As the temperature of an electrical conductor is lowered to temperatures in the aforementioned region, the resistance thereof decreases approaching a very low value when the temperatuer reaches absolute zero. However, certain conductors, called superconductors, drop abruptly in resistance to zero at a temperature somewhat above absolute zero. In the present invention both superconductors and non-superconductors are employed to advantage as hereinafter more fully described.

Referring to FIGS. 1 and 2, the electric machine or motor in accordance with the present invention includes a housing 1, a field structure conveniently comprising stator portions 2 and 3, and an armature or rotor 4 arranged for continuous rotation relative to the field structure. In the embodiment illustrated, the outer stator portion 2 is circumferentially supported by housing 1 and has a large circumferential bore for receiving inner stator portion 3. Inner cylinder stator portion 3 is supported at one end thereof from housing 1 to which it is secured by means of bolt assembly 5.

Inner stator portion 3 is inserted within outer stator portion 2 in juxtaposed relation, leaving a uniform close-spaced cylindrical gap therebetween. Both stator portions are formed of iron laminations and are preferably wound with conventional 3-phase windings 6 and 7, received in slots 8 and 9 of the respective stator portions.

Windings 6 and 7 are preferably superconductive and may be connected in Y or delta for suitable energization with 3-phase alternating current during operation of the motor. Slots 9 in inner rotor portion 3 correspond in number and approximate location to slots 8 in outer rotor portion 2. Also the winding connections are substantially similar where the stator portions face one another whereby alternating current energization causes a substantial magnetic flux through and perpendicular to the gap between the stator portions. Slots 8 and 9 are also preferably slightly offset with respect to one another as illustrated in FIG. 2 in order to lessen the modulating effect of the winding slots on the permeability of the magnetic circuit. When alternating current is provided these windings, the superposition of three stationary but alternating magnetic fields produced by the windings establishes a sinusoidally distributed magnetic field revolving around the gap between the stator portions in synchronism with the alternating current frequency. The machine's windings do not constitute the present invention and are well understood by those skilled in the art. A rotating field may also be produced with other winding arrangements, for example, with two phase windings appropriately energized.

Armature 4, which conveniently comprises the rotor or rotating portion of the motor, is substantially cylindrical in shape and has a thin cylindrical section 10 for rotatable reception within the gap between stator portions 2 and 3. This section 10 is of substantially constant thickness and is spaced from each of the stator portions 2 and 3 at an approximately equal but small constant distance from each of the stator portions. Section 10 is conductive but not superconductive at the operating temperature of the device, the temperature being determined by the temperature of the cryogenic fluid or medium employed, e.g. the liquid helium.

It is observed that rotor section 10 has a substantially continuous surface of conducting metal adjacent and at a substantially constant distance from the stator. The rotor section adjacent the stator has no projections extending toward the stator nor are such necessary in order to cause rotation of the rotor. The rotor turns on the induction motor principle as hereinafter described.

The rotor is provided with two end sections 11 and 12 in the form of superconductive end cylinders supporting the central section 10 and is also provided with radially outwardly extending flanges 13 and 14 at either end of the rotor. Both end sections and flanges are superconductive. The flanges may be unitary with cylindrical sections 11 and 12, with the flanges being located at the longitudinally most separated ends of the cylindrical sections 11 and 12. Cylindrical sections 11 and 12 as well as flanges 13 and 14 are conveniently formed of niobium metal which is superconducting at the preferred liquid helium operating temperatures.

Iron rings 15 and 16, supported inside frame 1, house annular bearing coils 17 and 18 which are positioned circumferentially around superconductive cylindrical sections 11 and 12 immediately adjacent superconductive flanges 13 and 14. A cover for each bearing coil is completed, except for a small gap, employing superconductive bearing plates 19 and 20, which may be niobium, for confronting the superconductive end sections 11 and 12 and superconductive flanges 13 and 14 in close spaced relation to both end sections and flanges. Bearing coils 17 and 18 are desirably energized with direct current establishing a magnetic field acting to suspend or float the whole rotor in its proper position with respect to the stator but without physical contact therewith.

As stated, end cylindrical sections 11 and 12 of the rotor as well as flanges 13 and 14 are superconductive at the temperature of the cryogenic medium. Superconducting material has the property of being diamagnetic, that is it excludes all magnetic fields. Advantage of this property is taken in supporting the rotor 4 within the annular bearing coils 17 and 18 circumferentially confronting superconductive cylindrical sections 11 and 12 of the rotor as above described. The magnetic flux from coils 17 and 18 acts to float or suspend the rotor within coils 17 and 18 on a cushion of magnetic flux. Undesirable axial movement of the rotor is prevented since coils 17 and 18 confront the superconductive end flanges 13 and 14 in opposing relation at each end of the rotor. Therefore, the motor rotor is completely suspended within the magnetic bearing means and only rotation of the rotor around its own axis is permitted. Further details relating to the construction and operation of electromagnetic bearings can be found in "Cryogenic Technology" by Robert W. Vance, John Wiley, 1963, chapter 9, "Applications of Superconductivity," by T. A. Buchhold.

Although magnetic flux is excluded from end sections of the rotor, central section 10 is purposefully made nonsuperconducting whereby the magnetic flux passing across the gap between stator portions 2 and 3 penetrates the thin cylindrical central section 10 of the rotor.

This rotor section 10 is a conductor having detectable resistance at the operating temperature and preferably comprises a thin aluminum cylinder since aluminum has the advantages of light weight and high electrical conductivity; however, high purity copper and other conductors may also be employed. The aluminum, while not superconductive at operating temperatures of the present invention, nonetheless has a very low resistance. When the magnetic flux from stator portions 2 and 3 rotates around the gap therebetween, passing through the rotor section 10, heavy electrical currents are induced in section 10 since it has this very low electrical resistance. It is observed that no flux would penetrate section 10 where it superconductive.

Because of the central rotor section's extremely small electrical resistance, it has induced therein and carries heavy electric currents even though it is small and thin in size. The resistance of aluminum at the temperature of liquid helium is several hundred times less than its resistance at room temperature, depending upon impurities present. Therefore currents are induced by the rotating magnetic field in section 10 which could only flow in a rotor of extraordinarily much larger size at room temperature.

The heavy currents induced in the rotor section 10 react with the rotating magnetic field of stator portions 2 and 3 to cause rotation of the cylindrical rotor around its cylindrical axis. The motor is thus a type of induction motor. The rotor accelerates to a velocity $\omega$, a little less than $\omega_0$, the angular velocity of the rotating flux of the stator. The velocity $\omega$ is less than $\omega_0$ by the quantity $s\omega_0$, where $s$ is the slip of the motor equalling $\omega_0 - \omega/\omega_0$.

The motor operates normally with a small slip and the rotor losses are small since the aluminum rotor has such high conductivity at cryogenic temperatures. The magnetizing current is higher than for a conventional motor inasmuch as the radial clearance between stator portions 2 and 3 must be large enough to conveniently receive rotor section 10. However, the motor may be operated at a smaller flux density than the usual motor because the heavy rotor current induced in the aluminum rotor section 10 provides adequate torque at lower flux densities. Operation at low flux density also keeps iron losses small.

In one motor construction in accordance with the present invention, the rotor radius was 1.35 cm., the stator gap was 1.52 mm., the thickness of the rotor was 0.05 cm., its length was 3.6 cm., and its resistivity was approximately $10^{-8}$ ohm-cm. at 4.2° K. The maximum rotor current per centimeter of circumference was calculated to be about 205 amperes per cm. at a slip equal to 0.01.

The superconducting bearings have a substantially infinite lifetime. They are highly advantageous in supporting the rotor of the present machine, substantially without the usual bearing friction, and at super-cold temperatures wherein ordinary bearings would exhibit high friction and limited lifetime. However, the rotor is resiliently cushioned in the magnetic flux of bearing coils 17 and 18; that is to say, the rotor is not rigidly supported. If a rotor of magnetic material, e.g. a solid iron rotor, were employed, and if the rotor were displaced slightly off axis, a force differential would result between rotor and stator and this force would increase rapidly with displacement. That is, a concentration of magnetic flux density between rotor and stator, resulting when the rotor is slightly off axis, will tend to pull the rotor even further off axis when the rotor is made of magnetic material. The effect is much reduced in the case of a thin cylindrical rotor of magnetic metal, but is still present. Therefore a rotor is preferred which is nonmagnetic insofar as the non-superconductive portions adjacent the stator are concerned. The heavy currents induced in the conducting but non-magnetic rotor section are sufficient to produce large torque without the inclusion of magnetic material. The construction employing inner and outer stator portions with a thin shell-like rotor therebetween is a very stable one. The gap between stator portions and therefore the magnetic circuit is constant, not being materially affected by movement of the non-magnetic rotor within the gap.

One suitable use for the motor, which in accordance with the present invention exhibits no wear, is in the pumping or circulation of cryogenic cooling medium such as liquid helium throughout superconducting apparatus, e.g. as in a cryogenic computer, wherein it is desired that all parts attain the same low temperature. In the illustrated embodiment, the motor in accordance with the present invention, drives a rotary impeller for circulating liquid helium. This impeller, 21 in FIG. 1, is mechanically joined to the rotor 4 for common rotation therewith at the end thereof opposite the inner stator section's support. Impeller 21 is received within a pump housing 22 which is attached to motor housing 1 and communicates with housing 1 centrally within rotor 4 and impeller 21. Therefore the impeller not only circulates the liquid helium outside the motor, but the impeller also acts to cause flow of the medium through the longitudinal length of the motor and through openings 23 at the opposite end of the motor whereby to cool the motor to the temperature of the cryogenic medium.

The machine in accordance with the present invention is not restricted to operation in liquid helium but may also operate in other cryogenic environments. The machine may operate in a gaseous environment or in another cryogenic liquid. For instance this type of machine is useful for operation in liquid hydrogen with non-superconducting windings and modified or non-superconducting bearings. However, the term "cryogenic," for purposes of the present application, is considered as relating to temperatures of liquid hydrogen or below.

While I have shown and described an exemplary embodiment of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new desire to secure by Letters Patent of the United States is:

1. An electric motor for developing rotational mechanical power in a cryogenic environment comprising a motor housing, a stator supported by said housing and provided with alternating current windings for producing a magnetic field rotating in proportion to the frequency of the alternating current provided said windings, a metallic rotor adapted for continuous rotation about its axis, said rotor being provided with a superconductive portion as well as a non-superconductive portion in the same cryogenic environment, wherein the said non-superconductive portion is disposed in juxtaposition with respect to said stator at a substantially constant spacing from said stator in the magnetic field thereof, and magnetic bearing means supported by said housing positioned in confronting relation around a superconductive portion of said rotor for providing a magnetic field confining the rotor in aligned relation with said axis by virtue of the said superconductive portion's excluding the magnetic field of said bearing means, said rotating field of said stator penetrating only the non-superconductive portion of said rotor inducing heavy currents therein as aided by the resistance reducing property of said cryogenic environment and reacting with said rotating field to produce rotation of said rotor about said axis.

2. An electric motor for developing rotational mechanical power in a cryogenic environment comprising a motor housing, first and second stator portions supported by said housing and juxtaposed with respect to one another defining a close spaced gap therebetween, alternating current windings for said stator portions for producing a magnetic field rotating in proportion to the frequency of alternating current provided said windings, a metallic rotor symmetrically free for continuous rotation about its own axis, said rotor having sections which are superconductive as well as non-superconductive within the same cryogenic environment wherein a non-superconductive section of said rotor is thin for reception within said close spaced gap having a substantially constant spacing relative to said stator portions, and magnetic field producing bearings confronting superconducting sections of said rotor with a magnetic field confining the rotor radially in aligned relation with said axis and restraining the rotor against axial movement as a result of magnetic field pressure against the said superconductive sections, said rotating field of said stator portions penetrating only the said non-superconducting section of said rotor inducing heavy currents therein as aided by the resistance reducing property of said cryogenic environment and reacting with said rotating field to produce rotation of said rotor about said axis.

3. An electric motor for developing rotational mechanical power in a cryogenic environment comprising a motor housing, inner and outer stator portions supported by said housing and juxtaposed with respect to one another defining a close spaced cylindrical gap therebetween, alternating current windings upon said stator portions for producing a magnetic field in said cylindrical gap rotating in proportion to the frequency of alternating current provided said windings, a metallic rotor free for continuous rotation about its axis, said rotor having a thin central cylindrical section of constant thickness being non-superconductive in said cryogenic environment and provided with cylindrical superconductive sections on either end thereof, wherein the non-superconductive section of said rotor is sufficiently thin for spaced reception within said cylindrical gap where it has substantially constant spacing relative to said stator portions, and magnetic field producing bearings confronting the superconductive sections of said rotor, the magnetic field of said bearings acting to confine the rotor radially in aligned relation with said axis and to restrain the rotor against axial movement by virtue of magnetic field pressure against the said superconductive sections, said rotating field of said stator portions penetrating the non-superconductive section of said rotor inducing heavy currents in said non-superconducting section within said cryogenic environment for reacting with said rotating field to cause rotation of said rotor about said axis.

4. The motor according to claim 3 wherein said rotor's non-superconductive thin cylindrical section is formed of aluminum.

5. The motor according to claim 4 wherein said windings are superconductive niobium and said rotor end sections are superconductive niobium.

6. An electric motor for developing rotational mechanical power in a cryogenic environment comprising a motor housing, inner and outer stator portions supported by said housing and juxtaposed with respect to one another defining a close spaced cylindrical gap therebetween, alternating current windings for said stator portions for producing a rotational magnetic field in said cylindrical gap rotating in proportion to the frequency of alternating current provided said windings, a cylindrical metallic rotor free for continuous rotation about its cylindrical axis, said rotor having a central non-superconductive cylindrical section, said rotor also having superconductive cylindrical sections on either end and radially extending superconductive flanges also on either end, the non-superconductive section of said rotor being thin for reception within said cylindrical gap and having a substantially constant spacing relative to said stator portions within said gap, said rotating field of said stator portions penetrating the non-superconductive section of said rotor and inducing heavy currents in said non-superconducting section in said cryogenic environment for reacting with said rotating field to produce rotation of said rotor about said axis, and magnetic field producing bearings confronting the superconducting end sections of said rotor circumferentially therearound providing a magnetic field confiining the rotor radially in aligned relation with said axis and said same bearings confronting said radially extending superconducting flanges for restraining the rotor against axial movement.

7. An electric motor for developing rotational mechanical power in a cryogenic environment comprising a motor housing, a central cylindrical stator portion supported at one end thereof by said housing, an outer stator portion substantially surrounding said central stator portion and supported outwardly by said housing, said outer stator portion being juxtaposed with respect to said central stator portion to define a close spaced cylindrical gap therebetween, alternating current windings upon said stator portions for producing a magnetic field in said cylindrical gap rotating in proportion to the frequency of alternating current provided said windings, a cylindrical metallic rotor free for continuous rotation about its cylindrical axis, said rotor having a thin non-magnetic cylindrical section between the ends of said cylindrical rotor which section is of substantially constant thickness and which is non-superconductive but exhibiting a low resistance in said cryogenic environment, wherein the said cylindrical section is received within said close spaced cylindrical gap with a substantially constant spacing between said cylindrical section and said stator portions crossways of said gap, said rotating field of said stator windings penetrating the said non-superconductive cylindrical section of said rotor inducing heavy currents therein which react with said rotating field to produce rotation of said rotor about said axis, said rotor being provided with superconducting end cylinders, centered on said axis for supporting the central section of said rotor, said end cylinders having radially outwardly extending superconducting flanges, a toroidal magnetic coil at each end of said rotor contained in each case within a superconducting cover supported by said housing and close spaced with respect to said superconducting end cylinders and their flanges in circumferentially surrounding relation to the said end cylinders, said toroidal magnetic coils providing magnetic flux bearing against said superconducting end cylinders and said flanges to provide radial and axial support for said rotor.

8. The motor according to claim 7 wherein said rotor's non-superconductive cylindrical section is aluminum, said windings are superconductive niobium, and said end cylinders and flanges and said covers are also superconductive niobium.

9. An electric motor for developing rotational mechanical power in a cryogenic environment including cryogenic liquid cooling medium comprising a motor housing, a central cylindrical stator portion supported at one end thereof by said housing, an outer stator portion substantially surrounding said central stator portion and supported by said housing, said outer stator portion being juxtaposed with respect to said central stator portion to define a close spaced cylindrical gap therebetween, alternating current windings upon said stator portions for producing a magnetic field rotating in proportion to the frequency of alternating current provided said windings, a cylindrical metallic rotor free for continuous rotation about its axis, said rotor having a thin non-magnetic cylindrical section between the ends of the rotor which section is of substantially constant thickness and which is non-superconductive but exhibits a low resistance in said cryogenic environment, wherein the said cylindrical section is received within said cylindrical gap with a substantially constant spacing between said cylindrical section and said stator portions across said gap, said rotating field of said stator penetrating the said non-superconductive cylindrical sections of said rotor inducing heavy currents therein for reacting with said rotating field to produce rotation of said rotor about said axis, said rotor having superconductive end sections, magnetic field producing means circumferentially confronting said end sections for confining said rotor for rotation around its own axis, a rotary impeller mechanically joined to said rotor at one end thereof adapted to rotate therewith and a housing surrounding said impeller communicating with said motor housing for passage of cryogenic cooling medium within said cryogenic environment through said motor as said impeller rotates.

References Cited by the Examiner

UNITED STATES PATENTS 3,005,117    10/1961    Buchhold    310—40
3,242,418    3/1966    Mela    310—52 X

FOREIGN PATENTS 515,033    11/1920    France.

MILTON O. HIRSHFIELD, *Primary Examiner.*

DAVID X. SLINEY, *Examiner.*